Nov. 14, 1961  C. L. DRACKA  3,008,344
BRAKE SLACK ADJUSTER
Filed April 23, 1959
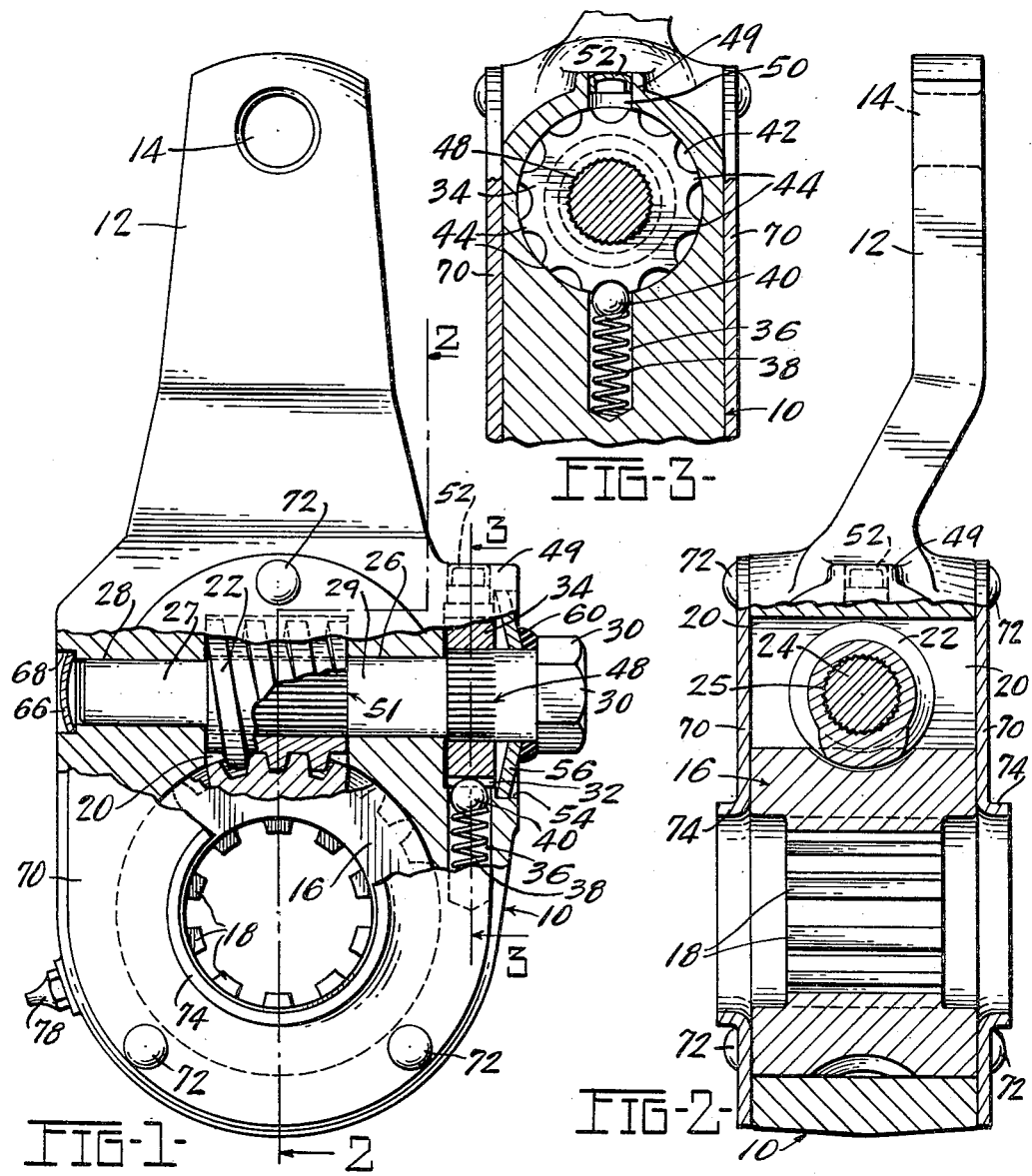
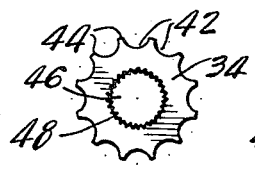
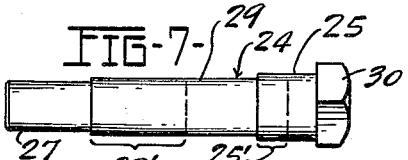
INVENTOR:
CLARENCE L. DRACKA
BY
Harry O. Ernsberger
ATTORNEY 3,008,344
BRAKE SLACK ADJUSTER
Clarence L. Dracka, Port Clinton, Ohio, assignor to Port Clinton Manufacturing Company, Port Clinton, Ohio, a corporation of Ohio
Filed Apr. 23, 1959, Ser. No. 808,377
5 Claims. (Cl. 74—527)

This invention relates to means for taking up slack in vehicle brake mechanism and more especially to a brake slack adjuster embodying an improved locking means for maintaining the slack adjusted in adjusted positions.

Slack adjusters for a vehicle brake mechanism and particularly those of a character utilized with brake mechanism of heavy duty vehicles usually comprise a combined body or arm section provided with a worm wheel or worm gear mounted on a brake actuating cam shaft in conjunction with a worm enmeshed with the worm gear and is rotatable for adjusting the position of the worm gear relative to the body to take up slack in the vehicle brake mechanism.

Various means have been devised for retaining the worm in adjusted position but difficulties have been encountered in providing a means which may be readily adjusted and the worm held or locked in adjusted position.

The brake slack adjuster mechanism, being mounted adjacent a vehicle axle housing, is exposed to extreme weather conditions and the parts become coated or caked with mud and foreign matter resulting in the formation of rust rendering adjustment difficult, and in certain forms of brake adjuster mechanism the locking means becomes ineffective to lock the worm in an adjusted position. Furthermore asphalt coating on highways, which becomes softened under the heat of the sun, is thrown by the vehicle wheels onto the slack adjuster mechanism and may render adjustment impossible.

The present invention embraces the provision of a brake slack adjuster of the worm and worm wheel type having an adjusting means which may be readily rotated and wherein the arrangement embodies a locking means which is effective under all conditions to retain the shaft and worm in adjusted position without further manipulation of mechanism other than rotating the worm adjusting shaft.

An object of the invention resides in the provision of a brake slack adjuster wherein the chamber within the body or arm section containing the locking means is sealed to prevent the ingress of foreign matter rendering the locking means operable throughout the life of the mechanism.

Another object of the invention is the provision of a locking means for a brake slack adjuster embodying a locking wheel of substantial diameter carried by an adjusting shaft and with which a detent is cooperable for positively holding the shaft, detent or locking wheel and adjusting worm in adjusted positions.

Another object of the invention is the provision of a brake slack adjuster wherein the adjusting shaft is press fitted into the worm and detent wheel fashioned with splines providing a permanent assembly in which the parts remain in their proper position on the shaft throughout the life of the mechanism.

Another object of the invention is the provision of an adjusting mechanism for a brake slack adjuster wherein rotational movement of the adjusting shaft may be effected without necessitating prior release of shaft locking means.

Another object of the invention is the provision of a brake slack adjusting mechanism which may be inexpensively manufactured and which is reliable in its operation and in which the locking means for the adjusting mechanism is automatically restored to locking position after adjustment.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view partly in section of a slack adjuster embodying the invention;

FIGURE 2 is a sectional view taken substantially on the line 2—2 of FIGURE 1;

FIGURE 3 is a detail sectional view taken substantially on the line 3—3 of FIGURE 1;

FIGURE 4 is an elevational view of the detent or locking wheel forming a component of the invention;

FIGURE 5 is a side view of the detent wheel shown in FIGURE 4;

FIGURE 6 is an elevational view illustrating a closure and sealing means forming a component of the construction, and FIGURE 7 is an elevational view of the worm adjusting shaft.

While the brake slack adjuster mechanism of the invention is especially usable in connection with brake mechanisms of heavy duty vehicles such as trucks and trailers, it is to be understood that the invention may be utilized wherever the same may be found to have utility.

Referring to the drawings in detail, the slack adjuster illustrated includes a body member or lever section 10 which has an extending portion 12 which, with the body portion, provides a brake operating lever or arm, the distal end region being provided with an opening 14 adapted to receive a brake actuating rod (not shown). The body 10 is provided with a generally circular opening to accommodate a worm wheel or worm gear 16 rotatably mounted therein and provided with a series of internal splines 18 for connection with the usual brake-operating cam shaft (not shown).

The body 10 is provided with a slot 20 adapted to accommodate a worm 22 which is in constant mesh with the worm wheel 16. The worm 22 is carried upon a shaft 24 journalled for rotation in bores 26 and 28 formed in the body 10 as shown in FIGURE 1. The surface defining the interior opening in the worm 22 is fashioned with a plurality of small splines which, during assembly with the shaft 24, sever or cut a reciprocally-shaped configuration on the shaft, the interengaging ridges or splines permanently fixing or locking the worm onto the shaft for rotation therewith.

The end of the shaft 24 extending exteriorly of the body 10 is formed with a noncircular or polygonally shaped head 30 which, as illustrated, is of hexagonal shape to accommodate a wrench or other tool for rotating the shaft 24. Rotation of the shaft 24 and the worm 22 rotates the worm wheel 16 relative to the body 10 for the purpose of adjusting the position of the brake-actuating cam shaft with respect to the brake-actuating rod which is connected with the arm 12 of the body 10. In this manner, any slack or clearance in the brake may be readily taken up.

The invention is inclusive of novel means for locking or maintaining the worm and worm shaft in adjusted positions and for sealing the chamber containing the locking means to prevent ingress of water and foreign matter. The body 10 is provided with a bore or circular recess 32 of substantial diameter, the axis of which is common to the axis of the bores 26 and 28, the recess 32 adapted to accommodate a detent wheel or locking disk 34 providing an enlargement on the shaft 24.

Arranged at a right angle to the axis of the bore 32 is a bore or cavity 36 in which is disposed an expansive coil spring 38 engaging a detent or ball 40.

As shown particularly in FIGURES 3 and 4, the peripheral region of the detent wheel 34 is formed with semicircular recesses 42 which are spaced circumferentially, there being twelve recesses in the illustrated embodiment. Each pair of recesses is separated by a ridge or land 44. The surface defining the circular opening 46 in the detent wheel or disk-like member 34 is formed with a plurality of longitudinally extending serrations or small splines shown at 48, the detent wheel being assembled on the shaft 24 in a manner hereinafter explained whereby the detent wheel is fixed on the shaft 24.

The bore or cavity 36 is formed in the body portion 10 by drilling through a shoulder portion 49 in the body forming a passage 50 in a shoulder portion. The comparatively short opening or passage 50 is closed by a closure member or eyelet 52 driven into the opening to effect a permanent closure in the entrance thereof.

The arrangement includes means for sealing the circular chamber or recess 32. Formed adjacent the circular recess 32 is a counterbore 54. Arranged to snugly fit within the counterbore 54 is an annular sealing disk or washer 56 preferably of dished or frusto-conical shape as shown in FIGURES 1 and 6. The opening in the annular member 56 accommodates the portion 25 of the shaft 24. Secured to the central region of the disk 56 is an annulus 60 formed of semi-hard rubber or similar material bonded or vulcanized to the surface of the disk.

In assembly, the metal disk 56 fits into the counterbore 54 and the sealing gasket portion 60 engages the peripheral portion 25 of the shaft 24 to establish a seal with the shaft. While the sealing gasket 60 is shown in contact with the head 30, it is to be understood that the head 30 may be spaced from the sealing gasket. The disk 56 may be fashioned of molded resinous plastic or semi-hard rubber having high strength characteristics and arranged to snugly fit the shaft portion 25 as a seal for the chamber 32 containing the detent or locking wheel. The shaft 24 is formed with a tenon portion 27 fitting within the bore 28, the intermediate portion 29 of the shaft 24 extending into the bore 26 and through the worm 22.

The components of the adjusting and locking mechanism are assembled in the following manner or method: The worm 22 is disposed in the slot 20 in mesh with the teeth of the worm wheel 16 disposed within the body 10. The spring 38 and the detent or ball 40 are disposed in the bore 36 in the position shown in FIGURE 1. The detent wheel or disk 34 is then fitted into the circular recess or chamber 32, the ball or detent 40 engaging in one of the recesses 42 formed in the periphery of the detent wheel. The sealing disk 56 provided with the sealing element or sealing gasket 60, is fitted into the counterbore 54. This preliminary assemblage of these components is thus in a position to receive the shaft 24. The shaft is inserted through these components, the portion 29 of the shaft being slightly larger than the diameter of the serrated opening in the worm 22 and is engaged with the entrance of the opening in the worm, and the portion 25 of the shaft 24 being larger than the diameter of the serrated opening 46 in the detent wheel 34 is restrained from entering the opening in the detent wheel.

The shaft 24 is then pressed or forced longitudinally under high pressure, entering the tenon or journal portion 27 into the bore 28 in the body 10, forcing the portion 29 of the shaft through the serrated opening in the worm 22, the serrated configuration in the worm functioning as a cutting means to sever or cut a reciprocally serrated configuration in the periphery of the portion 29' of the shaft 24 whereby the worm and shaft are fixedly secured or interlocked by the interengaging ridges provided by the serrations, the remaining length of the portion 29 fitting in the bore 26 forming a journal for the shaft.

Sufficient clearance exists between the bores 26 and 28 and the adjacent regions of the shaft to provide for rotation of the shaft. During movement of the shaft under high pressure into assembled position, the portion 25 of the shaft is engaged with the serrated opening 48 in the detent wheel 34 and as this portion of the shaft is forced into the opening, such serrated configuration in the detent wheel severs or cuts a reciprocally shaped serrated region in the portion 25' of the shaft 24 whereby the detent wheel and shaft are permanently joined or interlocked together. The portion 29' shown in FIGURE 7 indicates the region that is serrated by the worm 22, and the portion 25' indicates the region of the shaft that is serrated by the detent wheel 34 during assembly. After the shaft 24 is inserted, pressure is exerted against the metal disk 56 to expand its periphery to seal in the counterbore 54, and adjacent portions of the body 10 staked or swaged over the periphery of the disk 56 to securely retain the disk in the counterbore. In this manner the chamber 32 containing the locking wheel and detent mechanism is effectively sealed against the ingress of water or other foreign matter.

A Welch plug 66 is fitted into a counterbore 68 provided at the terminus of the bore 28 to seal the entrance of the bore at the end of the shaft portion 27. Due to the splined interlocking of the worm 22 on the shaft portion 29' and the detent wheel 34 on the shaft portion 25, these components are fixedly locked on the shaft 24 and prevent any endwise movement of the shaft thus providing a permanent assembly.

Sheet metal plates 70 are fitted to each side of the body 10 and are held in assembled relation by means of rivets 72 extending into openings in the body portion 10. The plates 70 effectively close the chamber 20 accommodating the worm 22, the plates being provided with circular flanges 74 defining openings to accommodate the brake-operating cam shaft which engages the splines 18 of the worm wheel 16.

It should be noted that the detent wheel 34 is of substantial diameter and in the embodiment illustrated is about two and one-half times the diameter of the shaft portion 25. This is an important feature of the invention as it provides for large recesses 42 spaced circumferentially and adapted to accommodate a ball or detent 40 of substantial size so that engagement of the ball 40 in a recess 42 effectively prevents rotation of the shaft 24 and the worm 22 under the thrust of brake applying forces.

While the spiral tooth of the worm 22 is of comparatively low pitch, under the thrust of high braking forces and vibration or "brake chatter" there may be a tendency for the worm wheel to rotate the worm. With the large diameter detent wheel 34 cooperating with the ball or detent 40, the shaft 24 is effectively locked in adjusted position.

When the operator desires to adjust the worm 22 with respect to the worm wheel 26, a wrench or other suitable tool is applied to the head 30 and the shaft 24 rotated to the position desired in order to take up slack in the brake mechanism. The expansive pressure of the spring 36 effective to maintain the ball in a recess in the detent wheel 34 is readily overcome by forced applied to the wrench or other tool in engagement with the head 30 so that during rotation of the shaft 24, the detent or ball 40 rides over the lands 44 until the proper adjustment has been made. In adjusted position, the ball or detent 40 engages in a recess 42 and prevents rotation of the shaft 24 and the worm 22 during brake setting operations. It will be apparent that adjustment may be quickly and easily made by simply applying a wrench or suitable tool to the head 30 and rotating the shaft without the necessity of manipulation of any other elements. It will also be noted that locking mechanism is completely enclosed and may be relied upon to function effectively throughout the life of the construction as the locking mechanism is not subject to deterioration by water or other foreign matter because the seal 60 prevents ingress of foreign matter into the chamber 32.

The portions 25 and 29 of the shaft are partially hardened and the detent wheel 34 also hardened to a certain degree so that the forcing or pressing of the shaft 24 into position during assembly will effect a cutting of the serrations 48 in portion 25' of the shaft by the detent wheel and the cutting of serrations 51 on portion 29' of the shaft by the worm 22 to provide for a proper interlock of these elements on the shaft.

It will be seen that the construction employs few parts and which may be inexpensively manufactured providing an arrangement which is not subject to deterioration by mud, water and other foreign matter and which may be readily manipulated by the use of a simple wrench or similar tool.

The body 10 is provided with fitting 78 for introducing lubricant or grease into the region of the teeth on the worm wheel 16 for lubricating the construction.

It is apparent that, within the scope of the invention, modifications and different arrangements may be made other than as herein disclosed, and the present disclosure is illustrative merely, the invention comprehending all variations thereof.

I claim:

1. A brake slack adjuster of the character disclosed, including in combination, a body, a shaft rotatably mounted in the body and having a portion projecting exteriorly of the body shaped to accommodate a tool for rotating the shaft relative to the body, a chamber formed in said body, locking means for the shaft including an enlargement provided on the shaft in said chamber, said enlargement having its peripheral region formed with a plurality of circumferentially spaced recesses, a bore formed in said body adjacent the enlargement, a ball detent disposed in said bore, a coil spring disposed between the bottom of the bore and the ball detent arranged to bias the detent into engagement with the recessed periphery of said enlargement, a cap closing the entrance of said bore, and closure means surrounding the shaft and disposed adjacent said enlargement to prevent ingress of foreign matter into said chamber.

2. A brake slack adjuster of the character disclosed, including in combination, a body, a shaft rotatably mounted in the body and having a head portion projecting exteriorly of the body and shaped to accommodate a tool for rotating the shaft relative to the body, a chamber formed in said body, locking means for the shaft including a disk-like member in said chamber secured on the shaft for rotation therewith and having its peripheral region formed with a plurality of circumferentially spaced recesses, a bore formed in said body adjacent the member, a detent disposed in said bore, a coil spring disposed in the bore and engaging the bottom thereof and the detent for biasing the latter into engagement with the recessed periphery of said member, a plug closing the entrance of said bore, closure means disposed adjacent said member including an annular metal element of frusto-conical shape, and a sealing gasket engaging said annular metal element and the head portion of the shaft.

3. A brake slack adjuster of the character disclosed, including in combination, a body, a shaft rotatably mounted in the body and having a polygonally shaped portion projecting exteriorly of the body and shaped to accommodate a tool for rotating the shaft relative to the body, a chamber formed in said body, locking means for the shaft including a disk-like member in said chamber secured on the shaft for rotation therewith and having its peripheral region formed with a plurality of circumferentially spaced recesses, a bore formed in said body adjacent the member, a detent disposed in said bore, a coil spring disposed in said bore between the bottom of the bore and the detent for biasing the latter into engagement with the recessed periphery of said member, a friction cap closing the entrance of the bore, a counterbore formed in said body adjacent the chamber, closure means surrounding the shaft and disposed in said counterbore adjacent said member, and non-metallic sealing means associated with the closure means anl polygonally shaped portion of the shaft to prevent ingress of foreign matter into said chamber.

4. A brake slack adjuster of the character equipped with a worm and worm wheel adjustment including, in combination, a body, a shaft extending through and secured to the worm and journalled in openings in the body, said shaft having a polygonally shaped head portion extending exteriorly of the body and adapted to receive a wrench for rotating the shaft and worm to adjust the body with respect to the worm wheel, a chamber formed in the body, locking means including a member disposed in said chamber and fixedly mounted on said shaft for rotation with the shaft, a bore formed in the body, a detent in said bore, a coil spring in said bore having one end bottoming in the bore and the other engaging the detent, said member having its periphery formed with circumferentially spaced recesses, said detent being biased by said spring into engagement with the recessed periphery of the member for locking the shaft in adjusted positions, a cap closing the entrance of the bore, a counterbore formed in said body adjacent said chamber, closure means for said chamber comprising an annular element of dish-shape cross section surrounding said shaft and disposed in the counterbore, and an annular sealing member formed of non-metallic material bonded to said annular element and engaging the head portion of said shaft to provide a seal for the chamber.

5. A brake slack adjuster of the character equipped with a worm and worm wheel adjustment including, in combination, a body, a shaft extending through and secured to the worm and journalled in openings in the body, said shaft having a polygonally shaped head portion extending exteriorly of the body and adapted to receive a wrench for rotating the shaft to rotate the worm to adjust the body with respect to the worm wheel, a circular chamber formed in the body, locking means including a detent wheel disposed in said chamber and fixedly mounted on said shaft for rotation with the shaft, a bore formed in the body, a ball detent in said bore, said detent wheel having its periphery formed with circumferentially spaced recesses, a coil spring in said bore disposed between the bottom of the bore and the ball detent and biasing said detent for cooperation with the recessed periphery of the detent wheel for locking the shaft in adjusted positions, a friction cap closing the entrance of the bore, a counterbore formed in said body adjacent said chamber, closure means for said chamber comprising an annular metal member of dish-shape cross section surrounding said shaft, an annular sealing element formed of nonmetallic material bonded to said annular member and engaging the head portion of the shaft to provide a seal for the chamber accommodating the locking means.

References Cited in the file of this patent

UNITED STATES PATENTS

| | | |
|---|---|---|
| 1,604,501 | Thomas | Oct. 26, 1926 |
| 1,998,728 | Marles | Apr. 23, 1935 |
| 2,012,011 | Keller | Aug. 20, 1935 |
| 2,347,186 | Freeman | Apr. 25, 1944 |
| 2,348,734 | Freeman | May 16, 1944 |
| 2,377,014 | Keller | May 29, 1945 |
| 2,558,115 | Williams | June 26, 1951 |
| 2,687,046 | Vorech | Aug. 24, 1954 |
| 2,688,299 | Gload et al. | Sept. 7, 1954 |
| 2,792,084 | Mossey | May 14, 1957 |
| 2,803,970 | Sacks | Aug. 27, 1957 |